US012532193B2

(12) United States Patent
Forenza et al.

(10) Patent No.: US 12,532,193 B2
(45) Date of Patent: Jan. 20, 2026

(54) REAL-TIME RIC ARCHITECTURE FOR OPEN RAN NETWORKS

(71) Applicants: RAKUTEN MOBILE, INC., Tokyo (JP); Rakuten Symphony, Inc., Tokyo (JP)

(72) Inventors: Antonio Forenza, San Fernando, CA (US); Nagendra Bykampadi, Bangalore (IN); Awn Muhammad, Yokohama (JP)

(73) Assignees: RAKUTEN MOBILE, INC., Tokyo (JP); RAKUTEN SYMPHONY, INC., Tokyo (JP)

( * ) Notice: Subject to any disclaimer, the term of this patent is extended or adjusted under 35 U.S.C. 154(b) by 522 days.

(21) Appl. No.: 17/910,862

(22) PCT Filed: Apr. 22, 2022

(86) PCT No.: PCT/US2022/025868
§ 371 (c)(1),
(2) Date: Sep. 12, 2022

(87) PCT Pub. No.: WO2023/191823
PCT Pub. Date: Oct. 5, 2023

(65) Prior Publication Data
US 2024/0214833 A1 Jun. 27, 2024

Related U.S. Application Data

(60) Provisional application No. 63/325,886, filed on Mar. 31, 2022.

(51) Int. Cl.
H04W 24/02 (2009.01)
H04L 41/16 (2022.01)
(Continued)

(52) U.S. Cl.
CPC ............ H04W 24/02 (2013.01); H04L 41/16 (2013.01); H04W 28/0858 (2020.05); H04W 28/09 (2020.05); H04W 88/12 (2013.01)

(58) Field of Classification Search
CPC . H04W 24/02; H04W 28/09; H04W 28/0858; H04L 41/16
See application file for complete search history.

(56) References Cited

U.S. PATENT DOCUMENTS 11,653,267 B2    5/2023  Zhou et al.
2010/0261427 A1  10/2010 Mills et al.
(Continued)

FOREIGN PATENT DOCUMENTS

EP   3 869 847 A1      8/2021
WO   2021/048831 A1    3/2021
WO   2021/144976 A1    7/2021

OTHER PUBLICATIONS

ArXiv: submission history of the article "Toward Next Generation Open Radio Access Network—What O-RAN Can and Cannot Do!" by Aly S. Abdalla et al., 2021 (Year: 2021).*

(Continued)

Primary Examiner — Won Tae C Kim
(74) Attorney, Agent, or Firm — Sughrue Mion, PLLC

(57) ABSTRACT

A system for providing real-time services and functions in an Open Radio Access Network (O-RAN) architecture, includes: a first physical node comprising at least one first processor configured to execute instructions to implement an O-RAN centralized unit (O-CU); at least one second physical node comprising at least one second processor configured to execute instructions to implement: an O-RAN distributed unit (O-DU), and a real-time (RT) RAN Intelligent Controller (RIC) connected to the O-DU via an interface terminating at the RT RIC and having a latency of less than 10 ms; an O-RAN radio unit (O-RU); at least one third (Continued)

physical node comprising at least one third processor configured to execute instructions to implement a non-real-time (Non-RT) RIC operating at a time scale of greater than 1 second; and at least one fourth physical node including at least one fourth processor configured to execute instructions to implement a near-real-time (Near-RT) RIC operating at a time scale of 10 ms to 1 second, wherein the RT RIC is a software platform configured to host applications for controlling at least the O-DU over a real-time control loop with a latency of less than 10 ms.

8 Claims, 12 Drawing Sheets

(51) Int. Cl.
*H04W 28/08* (2023.01)
*H04W 88/12* (2009.01)

(56) References Cited

U.S. PATENT DOCUMENTS

| | | | |
|---|---|---|---|
| 2012/0300710 | A1 | 11/2012 | Li et al. |
| 2017/0318468 | A1 | 11/2017 | Aijaz |
| 2018/0287696 | A1 | 10/2018 | Barbieri et al. |
| 2021/0258969 | A1 | 8/2021 | Yang et al. |
| 2021/0409977 | A1 | 12/2021 | Dussmann et al. |
| 2022/0159525 | A1 | 5/2022 | Chou et al. |
| 2022/0167182 | A1 | 5/2022 | Ramamurthi et al. |
| 2022/0167236 | A1 | 5/2022 | Melodia et al. |
| 2023/0289656 | A1 | 9/2023 | Butt et al. |
| 2024/0214832 | A1 | 6/2024 | Byun et al. |
| 2024/0378506 | A1* | 11/2024 | D'Oro ................... G06N 20/00 |
| 2024/0389018 | A1* | 11/2024 | Sung .................... H04W 88/08 |
| 2025/0234231 | A1 | 7/2025 | Hannák et al. |

OTHER PUBLICATIONS

Sameer Kumar Singh, et al., "The Evolution of Radio Access Network Towards Open-RAN: Challenges and Opportunities", IEEE, 2020, 7 pages total.

Aly S. Abdalla et al., "Toward Next Generation Open Radio Access Networks—What O-RAN Can and Cannot Do!", IEEE Network Magazine, Mar. 2022, pp. 1-8.

Laurent Petit et al., "Aggregated Massive Modular Paradigm: A 6G Telecom Infrastructure Vision", 2020, pp. 1-5.

International Search Report of PCT/US2022/025868 dated Aug. 30, 2022 [PCT/ISA/210].

Written Opinion of PCT/US2022/025868 dated Aug. 30, 2022 [PCT/ISA/237].

Anonymous, "O-RAN Working Group 2 AI/ML workflow description and requirements", O-RAN Alliance, 2020, O-RAN.WG2.AIML-v01.01, pp. 1-47 (47 pages total).

* cited by examiner

REAL-TIME RIC ARCHITECTURE FOR OPEN RAN NETWORKS

CROSS REFERENCE TO RELATED APPLICATIONS

This application is a National Stage of International Application No. PCT/US2022/025868, filed Apr. 22, 2022, claiming priority to US Provisional Patent Application No. 63/325,886, filed Mar. 31, 2022.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RAN Intelligent Controller (RIC). The RIC is a software-defined component that implements modular applications to facilitate the multivendor operability required in the O-RAN system, as well as to automate and optimize RAN operations. The RIC is divided into two types: a non-real-time RIC (Non-RT RIC) and a near-real-time RIC (Near-RT RIC).

The Non-RT RIC is the control point of a non-real-time control loop and operates on a timescale greater than 1 second within the Service Management and Orchestration (SMO) framework. Its functionalities are implemented through modular applications called rApps, and include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RAN Centralized Unit (O-CU), O-RAN Distributed Unit (O-DU), etc.).

The Near-RT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The Near-RT RIC uses the E2 interface to control the underlying RAN elements (E2 nodes) over a near-real-time control loop. The Near-RT RIC implements four services with respect to the E2 nodes (O-CU, O-DU, and O-eNB): report (request the node to report a function-specific value setting), insert (instruct the node to activate a user plane function), control (instruct the node to activate a control plane function), and policy (set a policy parameter on one of the activated functions). Further, the Near-RT RIC hosts xApps to implement functions such as interference mitigation, load balancing, security, etc. The two types of RICs work together to optimize the O-RAN. For example, the Non-RT RIC provides the policies, data, and AI/ML models enforced and used by the Near-RT RIC for RAN optimization.

The SMO framework, within which the Non-RT RIC is located, manages and orchestrates RAN elements. Specifically, the SMO manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within.

As set forth above, the intelligent management of O-RAN functions in the related art can only be performed for events and resources with a response time of no less than 1 second in the case of the Non-RT RIC, and 10 milliseconds in the case of the Near-RT RIC. That is, in the related art, the minimum latency between the E2 nodes and Near-RT RIC is more than 10 ms. Such a high latency loop impedes the usage of AI/ML and other multivendor intelligent management and controls for real-time operations and controls, such as within the O-DU control loop shown in FIG. 1.

SUMMARY

Aspects of one or more embodiments provide a novel real-time RIC (RT RIC) for performing O-RAN intelligent management in real-time.

Aspects of one or more embodiments utilize the power of artificial intelligence/machine learning (AI/ML) through a RT RIC to enable close integration of Radio Resource Management (RRM) in a Distributed Unit (DU) with AI models and inferences.

According to example embodiments, a system for providing real-time services and functions in an Open Radio Access Network (O-RAN) architecture, includes: a first physical node comprising at least one first processor configured to execute instructions to implement an O-RAN centralized unit (O-CU); at least one second physical node comprising at least one second processor configured to execute instructions to implement: an O-RAN distributed unit (O-DU), and a real-time (RT) RAN Intelligent Controller (RIC) connected to the O-DU via an interface terminating at the RT RIC and having a latency of less than 10 ms; an O-RAN radio unit (O-RU); at least one third physical node comprising at least one third processor configured to execute instructions to implement a non-real-time (Non-RT) RIC operating at a time scale of greater than 1 second; and at least one fourth physical node including at least one fourth processor configured to execute instructions to implement a near-real-time (Near-RT) RIC operating at a time scale of 10 ms to 1 second, wherein the RT RIC is a software platform configured to host applications for controlling at least the O-DU over a real-time control loop with a latency of less than 10 ms.

The RT RIC may be provided within the O-DU.

The RT RIC may be external to the O-DU.

The system may further include: a Service Management and Orchestration (SMO) framework, within which the Non-RT RIC is located, configured to manage and orchestrate RAN elements; and a first interface connecting the RT RIC to the SMO to implement at least one management service.

The system may further include a second interface connecting the RT RIC to the Non-RT RIC and through which Non-RT RIC is configured to provide at least one of policy-based guidance, machine learning (ML) management, and enrichment information to the RT RIC for optimizing the RAN.

The system may further include a third interface connecting the RT RIC to the Near-RT RIC and through which the Near-RT RIC is configured to provide at least one of policy-based guidance, machine learning (ML) management, and enrichment information to the RT RIC for optimizing the RAN.

The RT RIC may be configured to perform at least one of report, insert, control, and policy services with respect to the O-DU via the interface.

The RT RIC may be configured to perform at least one of interface management and service update functions with respect to the O-DU via the interface.

The RT RIC may be configured to host at least one application to integrate at least one Artificial Intelligence (AI)/Machine Learning (ML) model to Radio Resource Management (RRM) functions of the O-DU to make decisions and/or inferences in real-time.

The RT RIC may be configured to host at least one application for implementing functionalities for cell-free massive MIMO in real-time.

The RT RIC may be configured to host at least one application for utilizing a MAC scheduler of the O-DU in real-time.

The RT RIC may be configured to host at least one application for implementing a zero trust security framework in real-time.

According to example embodiments, an apparatus for implementing a Real-Time (RT) Radio Access Network (RAN) Intelligent Controller (RT RIC) in an Open RAN (O-RAN) system includes: memory storing instructions; and at least one processor configured to execute the instructions to: connect to an O-RAN distributed unit (O-DU) over an interface; and host one or more applications for controlling, via the interface, at least the O-DU over a real-time control loop with a latency of less than 10 ms.

The at least one processor may be further configured to execute the instructions to connect, over a first interface, to a Service Management and Orchestration (SMO) framework for managing and orchestrating RAN elements, in order to implement at least one management service.

The at least one processor is further configured to execute the instructions to: connect, over a second interface, to a Non-RT RIC; and obtain, from the Non-RT RIC via the second interface, at least one of policy-based guidance, machine learning (ML) management, and enrichment information for optimizing the O-RAN system.

The at least one processor may be further configured to execute the instructions to: connect, over a third interface, to a Near-RT RIC; and obtain, from the Near-RT RIC via the third interface, at least one of policy-based guidance, machine learning (ML) management, and enrichment information for optimizing the O-RAN system.

The at least one processor may be further configured to execute the instructions to perform at least one of report, insert, control, and policy services with respect to the O-DU via the interface.

The at least one processor may be further configured to execute the instructions to perform at least one of interface management and service update functions with respect to the O-DU via the interface.

The at least one processor may be further configured to execute the instructions to host at least one application to integrate at least one Artificial Intelligence (AI)/Machine Learning (ML) model to Radio Resource Management (RRM) functions of the O-DU to make decisions and/or inferences in real-time.

The at least one processor may be further configured to execute the instructions to host at least one application for utilizing a MAC scheduler of the O-DU in real-time.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
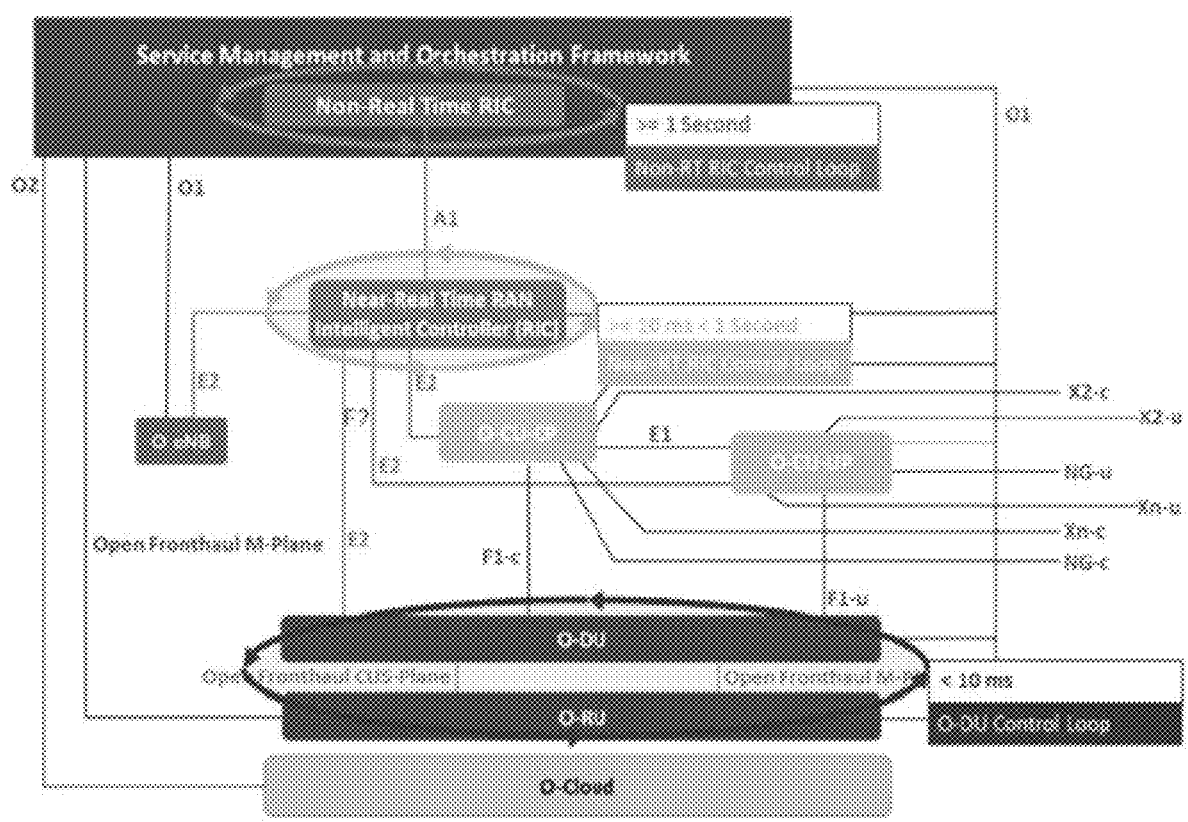
FIG. 1 illustrates a related art O-RAN architecture.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, the related art RICs are implemented as part of a near-real-time control loop (10 ms-1 second) and a non-real-time control loop (greater than 1 second). Due to their distance from the radio units and specific protocol stack implementations, the related art RICs cannot service real-time events or functions, such as the 1 ms control loop required by the MAC scheduler running in the O-DU that must reside close to the O-RUs that it manages. As a result, any implementation of real-time services or controls requires integration directly into the baseband receiver/transmitter's or O-DU's vendor-specific or proprietary software stack, which is blocked and inaccessible to other vendors.

Example embodiments provide a real-time RIC (RT RIC) that resides near or within the DU (or near the physical layer and/or MAC layer of the DU) and therefore is part of the DU-RU real-time control loop for servicing real-time functions and events in the radio access network. Additionally, the RT RIC is connected to other O-RAN network elements using open or standardized interfaces, thereby allowing for multi-vendor applications or microservices to be hosted thereon to provide real-time intelligent controls and services.

Real-Time RIC Architecture for Open RAN Networks

Figure 2A:
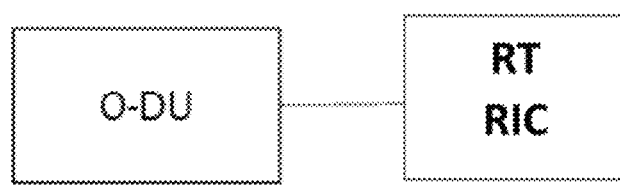
FIGS. 2A and 2B illustrate a general architecture of the real-time RIC (RT RIC) according to some example embodiments.
Figure 2B:
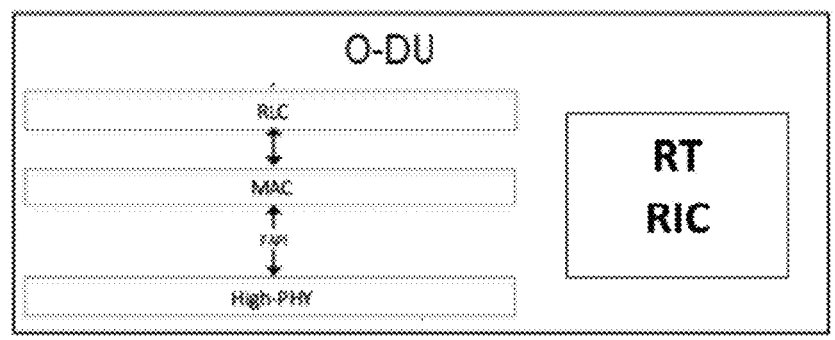

Hereinbelow, a real-time RIC architecture for O-RAN networks according to example embodiments will be described. FIGS. 2A and 2B illustrate a general architecture of the real-time RIC (RT RIC) according to some example embodiments. Referring to FIG. 2A, according to an embodiment, the RT RIC is external to the O-DU and connected to it via an interface or API. Referring to FIG. 2B, according to another embodiment, the RT RIC is inside the O-DU and connected directly to one or multiple units inside the O-DU via an interface. Here, the interfaces are either standard based (e.g., 3GPP, O-RAN, ITU, CNCF, TMF standards) or proprietary interfaces.

According to example embodiments, the RT RIC is integrated in or close to the physical layer and MAC layer of the O-DU so as to be able to provide real-time services and functions with a latency of less than 10 ms. Further, according to one or more example embodiments, the RT RIC connects to only one O-DU, unlike the related art RICs.

It is understood that one or more embodiments are not limited to the above configurations. For example, according to another embodiment, the RT RIC may be directly connected to a FrontHaul Multiplexer (FHM) in a shared-cell configuration (i.e., with multiple RUs connected to the same DU via the FHM), or may be directly connected to both the O-DU and the FHM.

Figure 3A:
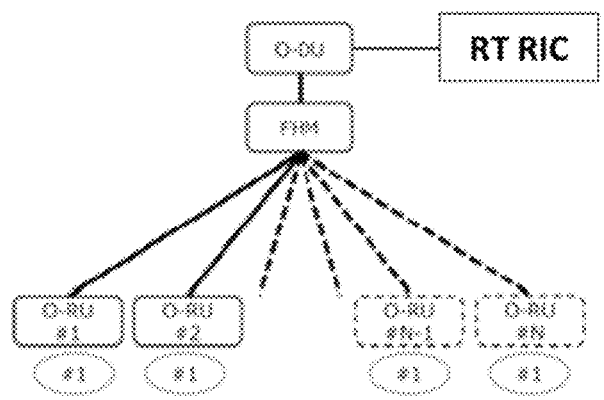
FIGS. 3A to 3D illustrate a general architecture of the RT RIC in a shared-cell configuration with a FrontHaul Multiplexer (FHM) according to some example embodiments.
Figure 3B:
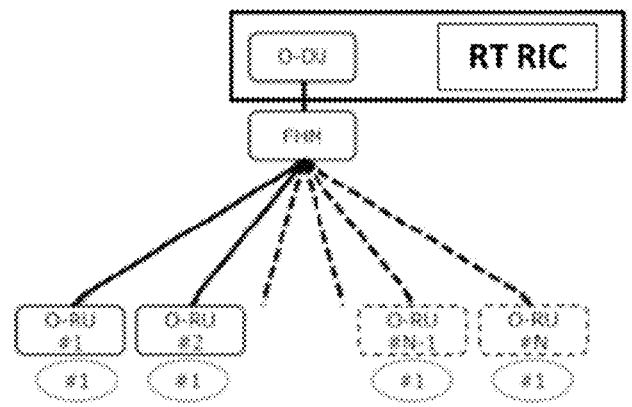

FIGS. 3A to 3D illustrate a general architecture of the RT RIC in a shared-cell configuration with an FHM, according to some example embodiments. That is, the RT RIC according to example embodiments may be integrated in O-RAN systems operating in a shared-cell configuration with an FHM mode. Referring to FIG. 3A, according to an embodiment, the RT RIC is connected to the O-DU via a standard or proprietary interface. Referring to FIG. 3B, according to another embodiment, the RT RIC is integrated within the same unit as the O-DU. In this case, the RT RIC may be implemented within the same processor (e.g., CPU, GPU, or any hardware accelerator) as the O-DU, or different processor within the same motherboard, or different motherboard within the same enclosure, or separate enclosure within the same rack, or separate rack within the same data center.

Figure 3C:
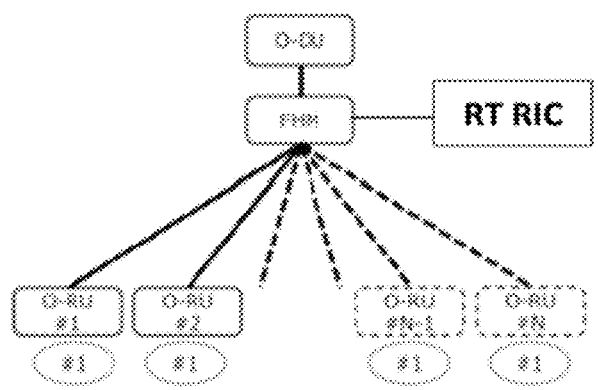
Figure 3D:
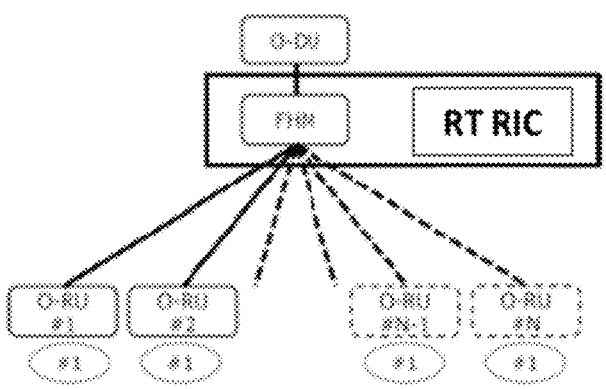

As set forth above, in some example embodiments, the RT RIC may be connected to or integrated with the FHM. Referring to FIG. 3C, according to an embodiment, the RT RIC is connected to the FHM via a standard or proprietary interface. Referring to FIG. 3D, according to another embodiment, the RT RIC is integrated within the same unit as the FHM. Similar to the embodiment of FIG. 3B, in this case, the RT RIC may be implemented within the same processor (e.g., CPU, GPU, or any hardware accelerator) as the FHM, or different processor within the same motherboard, or different motherboard within the same enclosure, or separate enclosure within the same rack, or separate rack within the same data center. According to one or more example embodiments, the FHM may be configured to aggregate data or control information (e.g., SRS signals) between one or a plurality of O-RUs and the RT RIC.

Figure 4:
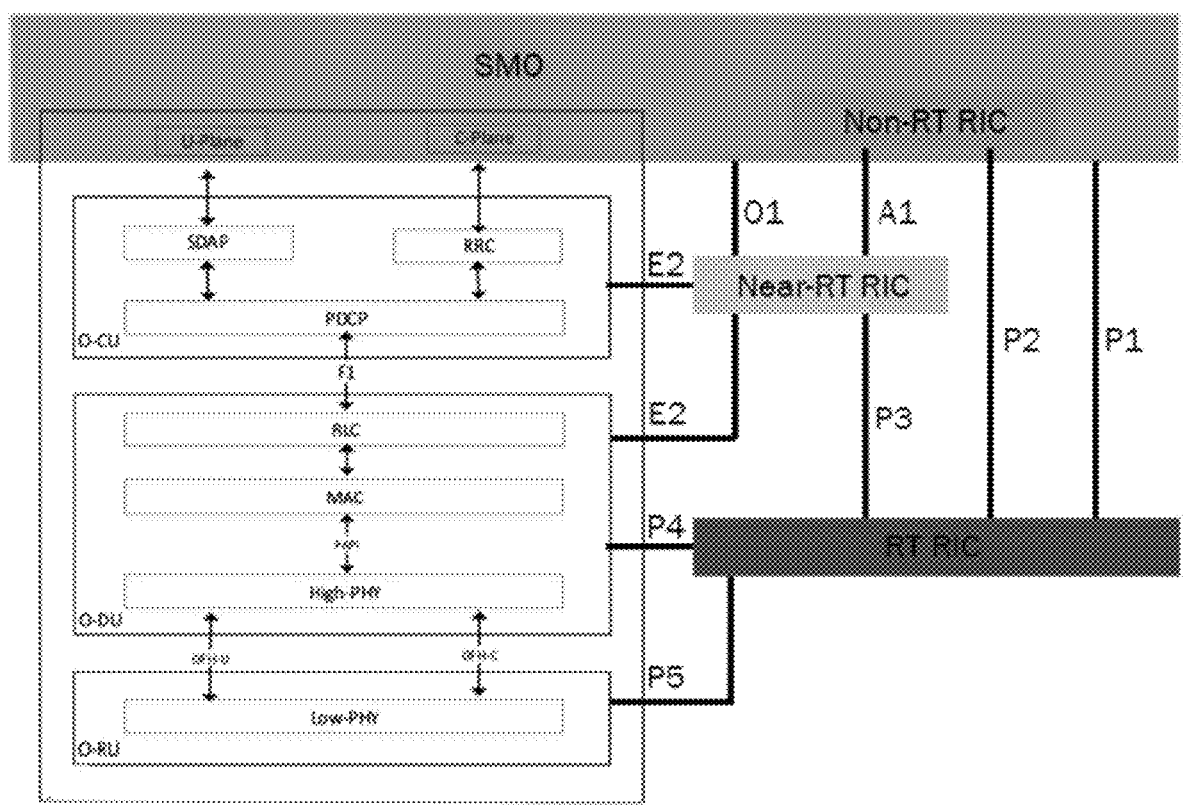
FIG. 4 illustrates an O-RAN architecture according to one or more example embodiments.

FIG. 4 illustrates an O-RAN architecture according to one or more embodiments. As compared to FIG. 1, the O-RAN architecture of the present example embodiment includes a RT RIC and multiple interfaces to inter-connect the RT RIC to other units within the O-RAN architecture.

Referring to FIG. 4, a first interface (labeled, by way of non-limiting example, a P1 interface) connects the RT RIC to the SMO. The first interface may be the Operation and Maintenance interface implemented through standards or proprietary interfaces using the Network Configuration Protocol (NETCONF) or any other network management protocol. In an embodiment, the network management protocol is used for Provisioning Management Services to Create Managed Object Instance, Delete Managed Object Instance, Modify Managed Object Instance Attributes and/or Read Managed Object Instance Attributes. In another embodiment, the first interface implements one or a plurality of services such as: fault supervision management, performance assurance management, trace management, file management, heartbeat management, physical network function (PNF) startup and registration management, and/or PNF software management. In another embodiment, the first interface is the O1 interface for the Near-RT RIC specified in [O-RAN·WG1·O1-Interface-0-v04.00] and shown in FIG. 1.

A second interface (labeled, by way of non-limiting example, a P2 interface) connects the RT RIC to the Non-RT RIC. The second interface enables the Non-RT RIC to provide policy-based guidance, ML model management and enrichment information to the RT RIC for optimizing the RAN. In an embodiment, the protocol stack of the second interface includes one or a plurality of layers such as Internet Protocol (IP), Transmission Control Protocol (TCP), Hypertext Transfer Protocol Secure (HTTPS), JavaScript Object Notation (JSON) and/or any other proprietary or standards layers. In another embodiment, the second interface is the A1 interface defined between the Non-RT RIC and the Near-RT RIC specified in [O-RAN·WG2·A1GAP-v02.02] and shown in FIG. 1.

A third interface (labeled, by way of non-limiting example, a P3 interface) connects the RT RIC to the Near-RT RIC. The third interface enables the Near-RT RIC to provide policy-based guidance, ML model management and enrichment information to the RT RIC for optimizing the RAN. In an embodiment, the protocol stack of the third interface includes one or a plurality of layers such as IP, TCP, HTTPS, JSON and/or any other proprietary or standards layers. In another embodiment, the third interface is the A1 interface defined between the Non-RT and Near-RT RIC specified in [O-RAN·WG2·A1GAP-v02.02] and shown in FIG. 1.

A fourth interface (labeled, by way of non-limiting example, a P4 interface) connects the RT RIC to network elements, e.g., at least one of the O-DU, O-CU-CP, O-CU-UP or O-eNB. The fourth interface enables different RT RIC services (e.g., report, insert, control, and policy) and support functions (e.g., interface management, service update, etc.). In another embodiment, the fourth interface may be the E2 interface defined for the Near-RT RIC specified in [O-RAN·WG3·E2GAP-v01.01] and shown in FIG. 1.

A fifth interface (labeled, by way of non-limiting example, a P5 interface) connects the RT RIC to the O-RU. The fifth interface is a direct logical channel or interface used for exchanging data and/or control information between the RT RIC and one or a plurality of O-RUS by implementing control, user and synchronization planes. In an embodiment, the P5 interface may be the Open FrontHaul interface specified in [O-RAN·WG4·CUS-0-v07.00] and shown in FIG. 1.

It is understood that one or more other embodiments are not limited to the O-RAN architecture described above with reference to FIG. 4. For example, it is understood that one or more of the above-described interfaces may be omitted and/or one or more additional or different interfaces may be included (e.g., an interface between the RT RIC and a FHM, as described above with reference to FIGS. 3C and 3D).

Figure 5:
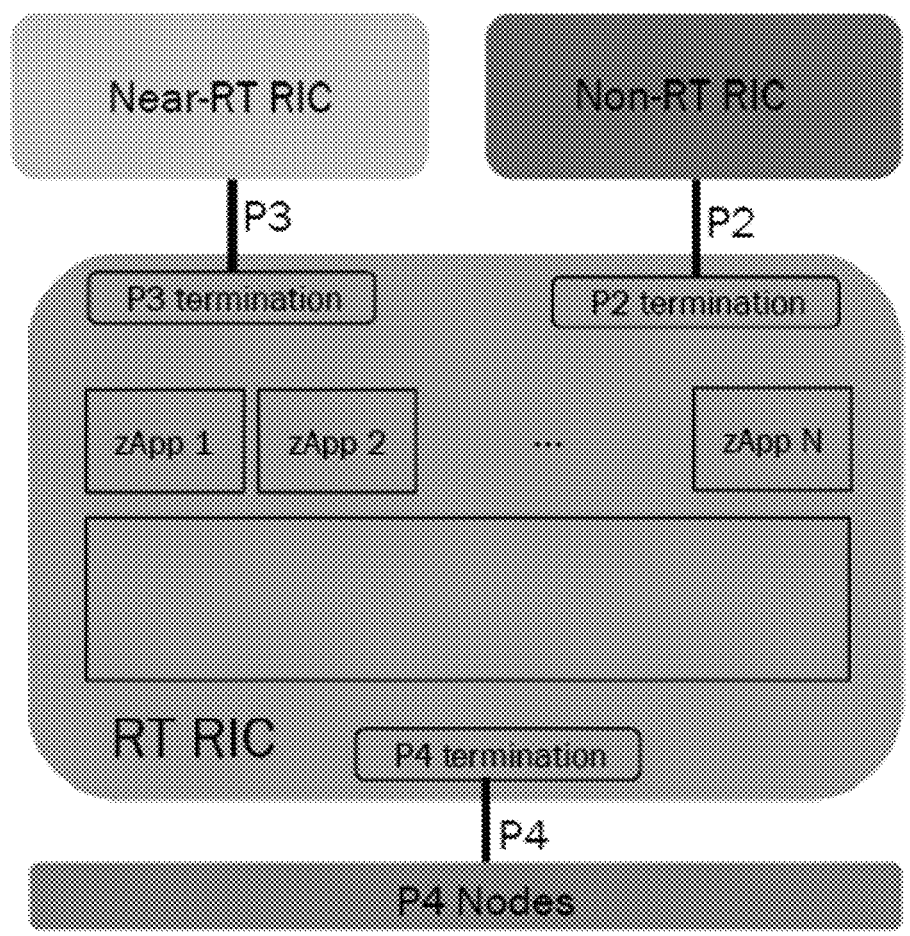
FIG. 5 illustrates a block diagram of a RT RIC according to one or more example embodiments.

FIG. 5 illustrates a block diagram of a RT RIC according to one or more example embodiments. Referring to FIG. 5, the RT RIC includes first (P2), second (P3) and third (P4) interface terminations to the P2, P3 and P4 interfaces, respectively. The RT RIC is a software-defined component that hosts one or a plurality of microservices or applications (referred herein by way of non-limiting example as zApps). The zApps implement methods or techniques to provide services, automation, control, optimization, etc., on a real-time basis (or at less than 10 ms latency). The zApps communicate with the Near-RT RIC, the Non-RT RIC, and other network components (e.g., O-DU, O-CU-CP, O-CU-UP, O-eNB) via above-described interfaces of the RT RIC. The zApps are implemented via proprietary or alternatively standard-defined multi-vendor interfaces. According to an example embodiment, the zApps communicate over open interfaces, therefore allowing them to be developed by multiple vendors and to be integrated into the O-RAN without opening any source code or proprietary software, or otherwise requiring access by the O-RAN operator (e.g., telco operator) or O-Cloud operator (e.g., telco operator or third-party data center) to the application's source code in order to integrate into the network.

The zApps implement methods or techniques for one or a plurality of use cases described below or any proprietary application or any third-party vendor application.

Example Use Case 1: AI/ML Based Physical Layer Enhancements

The RT RIC according to an example embodiment may host one or more zApps to effectively integrate AI/ML models to the real-time Radio Resource Management (RRM) functions of the DU. Because the RT RIC according to an example embodiment provides an open platform for hosting applications or microservices, such AI/ML models and corresponding applications can be developed by any of multiple vendors and providers and integrated into the network without opening/sharing any source code and without dependency on the telco or O-RAN operator's solutions.

In further detail, the RIC provides a standard framework for introducing intelligence in the RAN that is required to achieve automation and autonomy, using standard open interfaces and utilizing AI/ML in development of intelligent applications for network engineering, optimization, and operations, as described above.

In the related art O-RAN framework, the minimum latency between DU and Near-RT RIC is more than 10 ms. Such a high latency loop impedes the usage of AI/ML for actual channel estimation through low level measurement and other RRM functionalities like scheduling. This is because AI/ML-based channel estimation requires close coupling with low level RF measurements.

Utilizing the power of AI/ML through RT RIC (e.g., latency<10 ms) according to example embodiments enables close integration of RRM in DU with AI/ML models and inference. By way of example, the following use cases are possible through RT RIC integration of AI/ML within the O-DU RRM through AI/ML Models or inference:

- Chanel estimation and CSI feedback enhancements such as overhead reduction, improved accuracy, and prediction.
- Beam management improvements such as beam prediction in time, beam selection accuracy improvement.
- Improvement of RRM through low level measurements.
- User location positioning accuracy enhancements for different scenarios, including non-line-of-sight (NLOS) conditions.
- Advanced digital modulation techniques using AI/ML to improve demodulation and error rates. For example, bit error rates can be decreased through training-based blind channel estimation

Example Use Case 2: Cell-Free Massive MIMO

The RT RIC according to an example embodiment may host one or more zApps to effectively implement cell-free massive MIMO (multiple-input multiple-output).

Wireless data demand is growing year over year at a very fast pace due to increasing popularity of applications requiring high-definition video streaming and low-latency Internet of Things (IOT) connectivity. This demand may be satisfied by increasing capacity of cellular networks operating in the sub-6 GHz spectrum, e.g., via cell densification to increase spectral efficiency per unit area. Communications theory and practical field trials have shown, however, that there is a physical limit to cell densification due to increased inter-cell interference that results in significant degradation of signal integrity within each cell and therefore degradation in aggregate capacity. This effect is particularly exacerbated in indoor environments and large venues, specifically with steel structures that produce large number of multipath reflections and therefore high level of inter-cell interference.

One way to address the physical limitation of cell densification is to eliminate inter-cell interference altogether by using cell-free massive MIMO techniques. Cell-free massive MIMO techniques involve a massive number of access points distributed over a large area to coherently serve a massive number of user terminals in the same time/frequency band. These techniques have potential to increase capacity of cellular networks by over 10×. As a background, the first working testbed of this class of techniques ever built was originally named distributed-input distributed-output technology. The same technology was then implemented within the first LTE vRAN cellular infrastructure product ever built and named personal-cell (pCell) technology. Later on, this technology was widely adopted by the academia and renamed cell-free massive MIMO. Cell-free massive MIMO has currently been considered by the wireless industry as one of the core technologies for 5G and 5G-Advanced under the name of multiple transmission and reception points (multi-TRP) in 3GPP Rel.17 and beyond, as well as for next-generation 6G standards.

Cell-free massive MIMO is very different from related art massive MIMO techniques with centralized antenna arrays. By distributing antennas across a wide area, the wireless channels at different antennas experience uncorrelated long-term channel statistics that can be exploited to obtain "macro-diversity" gain. By contrast, in related art massive MIMO systems, all antennas from the same array experience the same pathloss and shadowing resulting in degraded performance. Also, related art massive MIMO systems are degraded by inter-cell interference (ICI) at cell edge just like any conventional cellular technology, unlike cell-free massive MIMO systems where ICI is removed throughout the coverage area.

Figure 6:
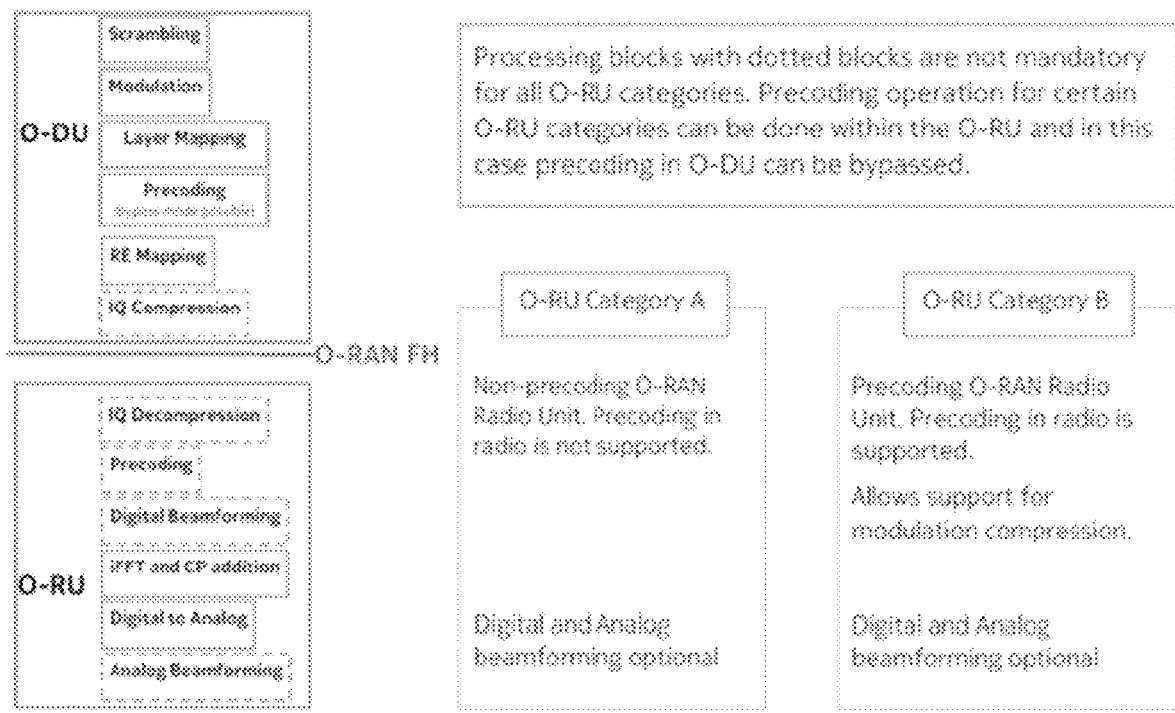
FIG. 6 illustrates a split 7.2 O-RAN system.

Related art massive MIMO systems use digital or analog beamforming with local processing at the Radio Unit (RU) in split 7.2 systems, as shown in FIG. 6, because the beamforming weights are calculated only for the antennas connected to the same RU. Therefore, there is no need for any RIC implementation in related art massive MIMO systems since all the processing for one antenna array is implemented at the RU. By contrast, cell-free massive MIMO systems precode waveforms across multiple RUs (wherein each RU is coupled with one or multiple antennas). Therefore, precoding must be implemented at the DU side.

Referring to FIG. 6, in related art O-RAN systems, each DU protocol stack generates In-band and Quadrature (IQ) samples for only one RU even in a shared-cell configuration with multiple RUs connected to the same DU via the FHM. By contrast, cell-free massive MIMO precoding methods apply to a plurality or all the IQ data streams sent from one DU to the multiple RUs.

The two types of RIC defined in related art O-RAN systems are not sufficient to address the tight real-time constraints required by cell-free massive MIMO techniques since they operate at a timescale of more than 1 second for the Non-RT RIC or between 10 ms and 1 second for the Near-RT RIC as in FIG. 1. Practical implementations of cell-free massive MIMO, however, require timing precision at a much shorter scale to guarantee stable calibration of the RF components for channel reciprocity, tight synchronization of the RUs and real-time implementation of signal processing algorithms to adapt the waveforms being transmitted or received through the RUs to the changing channel conditions via precoding techniques.

The RT RIC according to example embodiments operates at a time scale of less than 10 ms, and therefore can host zApps to implement new functionalities for cell-free massive MIMO.

Example Use Case 3: Advanced Scheduling

Figure 7:
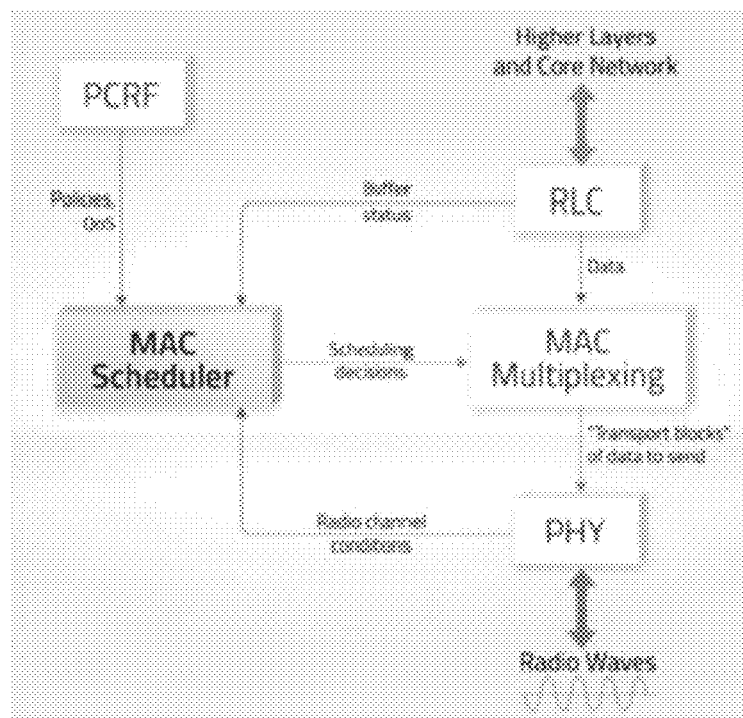
FIG. 7 illustrates a MAC scheduler architecture for a radio access network.

One of the key functionalities of the Medium Access Control (MAC) layer in LTE, 5G-NR or any wireless systems is the scheduler. The MAC scheduler implements different functions as depicted in FIG. 7, including:
  Assigning downlink (DL) or uplink (UL) bandwidth by allocating channel resources in time, frequency or spatial domains to different user equipments (UEs) based on information such as: channel quality indicators (CQI) from the UEs or RUs, or buffer status reports from the Radio Link Control (RLC) layer.
  Enforcing Quality of Service (QOS) rules from the Policy and Changing Rules Functions (PCRF) at the core network based on information such as: packet loss rate, maximum guaranteed/allowed bandwidth, relative priority of users.

Figure 8:
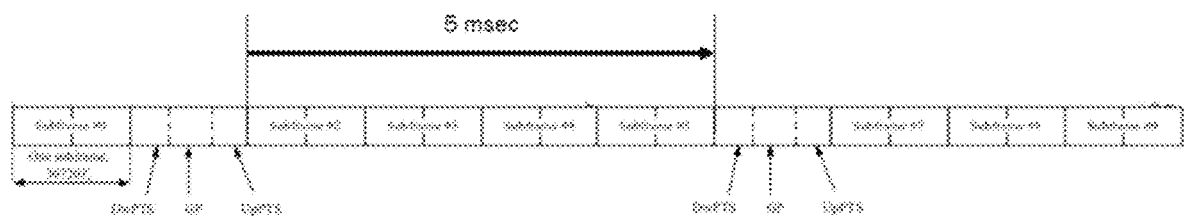
FIG. 8 illustrates a frame structure for Time Division Duplex (TDD) systems.

Dynamic bandwidth assignment to the UEs is typically accomplished by dedicating specific resource blocks (RBs) to the UEs based on their channel conditions. This channel assignment needs to occur within a very short period of time. For example, in Time Division Duplex (TDD) systems with the frame structure depicted in FIG. 8, the O-RAN DU (O-DU) may only have 5 ms from the time it receives the channel quality indicator (CQI) from the UEs over the uplink (UL) until the next set of CQIs is available over the next UL transmission. Further, the RF channel of the UEs may vary quite rapidly within those 5 ms depending on their mobility, making the current set of CQIs outdated by the next UL transmission. Therefore, for the MAC scheduler to work effectively, it needs to operate at a timescale lower than 10 msec. This issue is even more relevant with the 5G-NR frame where UL/DL switching may occur on sub-millisecond scale, depending on the frame configuration.

Figure 9:
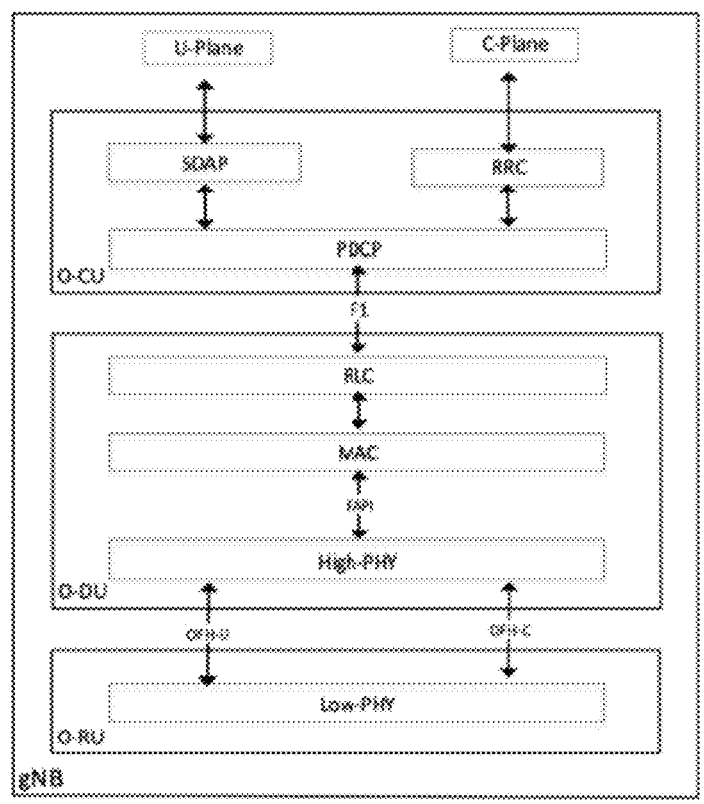
FIG. 9 illustrates an O-CU, O-DU, and O-RU architecture in an O-RAN system.

Further, PCRF rules at the core network may vary depending on the operators as well as uses cases that may require different QoS KPIs such as enhanced mobile broadband (eMBB), ultra-reliable low latency communications (URLLC) or massive machine type communications (mMTC). Depending on specific applications, different operators may upgrade their MAC scheduler or design proprietary scheduling techniques to implement their QoS rules and meet their specific KPIs. If the MAC scheduler is implemented inside the O-DU as shown in FIG. 9, updating the MAC scheduler would involve complete update of the entire O-DU which may be disruptive to the operation of the network.

The RT RIC according to example embodiments can operate or utilize the MAC scheduler at a timescale less than 10 ms while at the same time allowing operators to upgrade and customize their MAC scheduler through applications and microservices without having to disrupt the network operation. Further, the RT RIC according to example embodiments can run the MAC scheduler externally to thereby allow for customization of the O-DU functions through other real-time applications such as advanced massive MIMO or radio resource management (RRM) methods. For example, zApps hosted by the RT RIC can implement different energy savings algorithms designed to turn on and off antennas within massive MIMO arrays based on users' CQI and scheduler decisions that occur at time scale less than 10 ms.

By way of another example, the RT RIC according to an example embodiment may host a zApp to provide advanced energy savings methods for massive MIMO systems using the DU's MAC scheduler to select UEs at a cell-edge vs. cell-center. That is, a zApp hosted on the RT RIC according to an embodiment may turn on/off antennas of the array based on groups of UEs being at the cell-edge vs cell-center. Because such dynamic switching of antennas occurs at less than 5 ms scale in LTE and 5G-NR, it cannot be performed using the non- or near-real-time control loops of the related art RICs.

Example Use Case 4: Real-Time Observability and Security at the Edge

In the related art O-RAN architecture, it is not possible to dynamically inject security controls into the O-RU based on latest metadata derived from control packets or user plane packets. In particular, the related art architecture lacks the programmatic ability on O-RU or O-DU to a) digest received data from an observability platform on the O-RU or O-DU, b) co-relate with other parameters potentially available through other sources, and c) enforce new security actions by injecting new security controls/policies at real-time latency.

Meanwhile, in the age of zero trust, attacks are detected and handled at the point of occurrence, thus avoiding risk of lateral movement within the impacted platform, threat expansion to other parts of the network through external interfaces, etc. Due to its real-time time scale, the RT RIC according to example embodiments can host zApps to achieve a zero trust security framework. For example, the RT RIC can hosts one or more zApps to facilitate the following real-time implementation:

a) Collect and/or report information about the current state of assets, network infrastructure and communications at real-time observability platform in critical assets like O-RU and O-DU.
b) Continuously analyze the reported data and imposes required security controls at real-time to improve the security posture in the impacted asset.
c) Dynamically push security policies to detect and mitigate zero-day attacks that are otherwise not detected by existing tools.
d) Push security centric information to an upstream device for later analysis, which can then be used to refine policies and/or warn of possible attacks against critical/exposed assets (like O-RU).

Example Use Case 5: Upgrading AI/ML Models and Inference Through zApps

In the related art implementation of the O-DU protocol stack within O-RAN, the O-DU is a monolithic Virtualized Network Function (VNF) with all software (SW) components from a single vendor. This SW architecture may only be useful if the O-DU performs functionalities that are pre-programed.

However, if machine learning models and inferences, which need to be updated on a dynamic basis based on the latest learning data, are to be placed in the O-DU SW stack, the SW architecture would need to allow upgradation of AI/ML model. The RT RIC according to example embodiments can host zApps to upgrade or facilitate upgrading of AI/ML models or inference within the O-DU. In this regard, the RT RIC may implement several policies in accordance with example embodiments to avoid conflicts between various zApps and the O-DU's own functionalities. For example, life cycle management of AI/ML models and inferences within the O-DU can be standardized or controlled by policies defined or implemented via the RT RIC.

By way of further example, the RT RIC may implement policies in accordance with example embodiments that would restrict zApps running thereon to only be able to install, update, delete or suspend the AI/ML Models or inferences for which they have rights assigned thereto by the framework (e.g., RT RIC) controlling the zApps. Other processes such as model training (including input/output, online/offline), model validation, model testing, inference operations, data sets for training, validation, testing may also be defined and implemented in accordance with policies for conflict management between zApps and O-DU functionalities.

Figure 10:
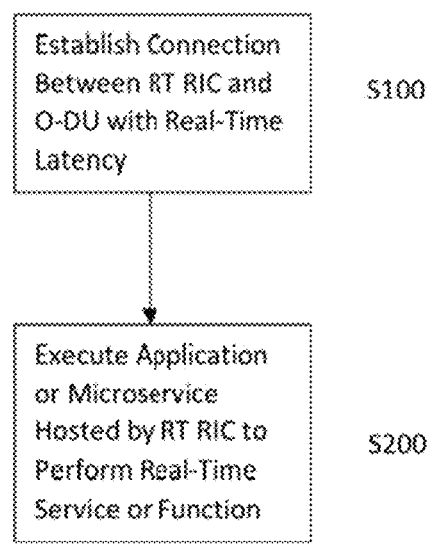
FIG. 10 is a flowchart of a method of implementing a RT RIC in an O-RAN system according to one or more example embodiments.

FIG. 10 is a flowchart of a method of implementing a RT RIC in an O-RAN system according to one or more example embodiments. Referring to FIG. 10, in operation S100, a RT RIC according to an example embodiment is connected to the O-DU via an interface to enable real-time (i.e., less than 10 ms) management and controls. For example, the RT RIC may be integrated within the O-DU and/or near the O-DU to connect to the physical layer and/or MAC layer with a latency of less than 10 ms.

In operation S200, a zApp hosted on the RT RIC is executed to provide real-time services and/or functions for the O-RAN system.

Figure 11:
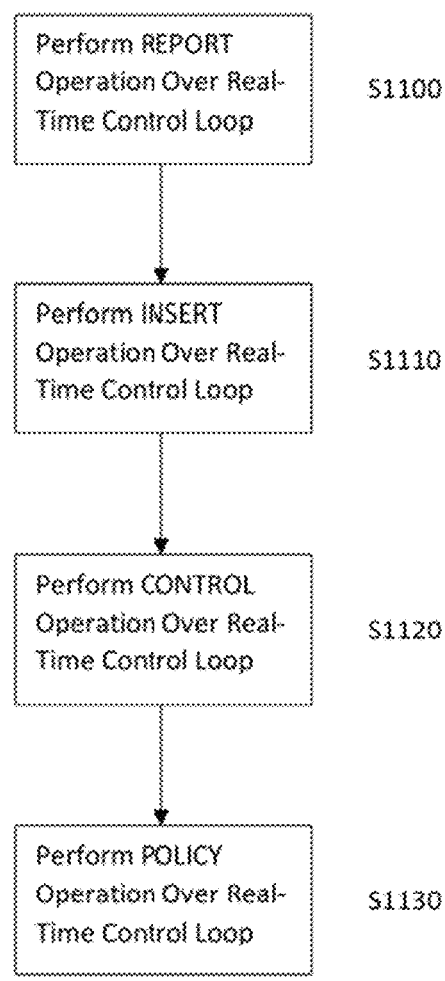
FIG. 11 is a flowchart of a method of providing services by a RT RIC according to an example embodiment.

FIG. 11 is a flowchart of a method of providing services by a RT RIC according to an example embodiment. Referring to FIG. 11, at operation S1100, the RT RIC performs a report operation with respect to a node (at least one of an O-DU, O-CU, O-RU, or O-eNB), over a real-time control loop. For example, in operation S1100, the RT RIC may ask the node to report a function-specific value setting.

In operation S1110, the RT RIC performs an insert operation with respect to a node (at least one of an O-DU, O-CU, O-RU, or O-eNB), over the real-time control loop. For example, in operation S1110, the RT RIC may instruction the node to activate a user plane function.

In operation S1120, the RT RIC performs a control operation with respect to a node (at least one of an O-DU, O-CU, O-RU, or O-eNB), over the real-time control loop. For example, in operation S1120, the RT RIC may instruction the node to activate a control plane function.

In operation S1130, the RT RIC performs a policy operation with respect to a node (at least one of an O-DU, O-CU, O-RU, or O-eNB), over the real-time control loop. For example, in operation S1130, the RT RIC may set a policy parameter on one of the activated functions.

In accordance with example embodiments, the RT RIC hosts one or more zApps that can subscribe to one or more of the above-described services (report, insert, control, and policy).

It is understood that one or more of the operations in FIG. 11 may be omitted, and/or one or more additional or different operations may be added. Further, it is understood that the operations shown in FIG. 11 may be performed in any order.

Figure 12:
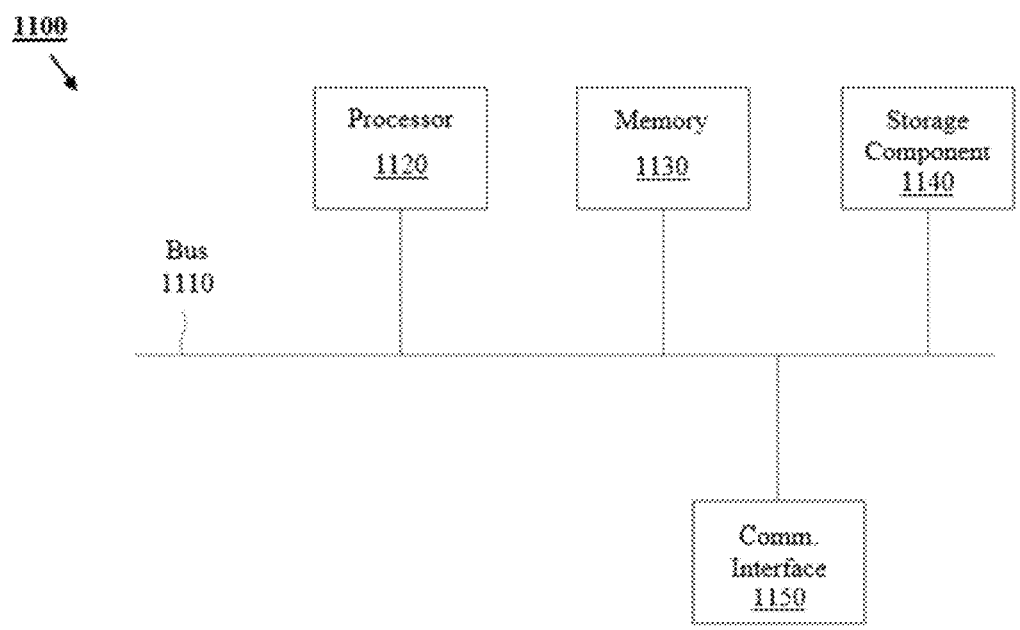
FIG. 12 is a diagram of components of one or more devices according to an example embodiment.

FIG. 12 is a diagram of components of one or more devices according to an example embodiment.

Device 1100 may correspond to any of the devices described above (e.g., device hosting RT RIC).

As shown in FIG. 11, the device 1100 may include a bus 1110, a processor 1120, a memory 1130, a storage component 1140, and a communication interface 1150. It is understood that one or more of the components may be omitted and/or one or more additional components may be included.

The bus 1110 includes a component that permits communication among the components of the device 1100. The processor 1120 is implemented in hardware, firmware, or a combination of hardware and software. The processor 1120 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 1120 includes one or more processors capable of being programmed to perform a function.

The memory 1130 includes a random access memory (RAM), a read only memory (ROM), and/or another type of dynamic or static storage device (e.g., a flash memory, a magnetic memory, and/or an optical memory) that stores information and/or instructions for use by the processor 1120.

The storage component 1140 stores information and/or software related to the operation and use of the device 1100. For example, the storage component 1140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The communication interface 1150 includes a transceiver-like component (e.g., a transceiver and/or a separate receiver and transmitter) that enables the device 900 to communicate with other devices, such as via a wired connection, a wireless connection, or a combination of wired and wireless connections. The communication interface 1150 may permit device 1100 to receive information from another device and/or provide information to another device. For example, the communication interface 1150 may include an Ethernet interface, an optical interface, a coaxial interface, an infrared interface, a radio frequency (RF) interface, a universal serial bus (USB) interface, a Wi-Fi interface, a cellular network interface, or the like.

The device 1100 may perform one or more processes or functions described herein. The device 1100 may perform operations based on the processor 1120 executing software instructions stored by a non-transitory computer-readable medium, such as the memory 1130 and/or the storage component 1140. A computer-readable medium is defined herein as a non-transitory memory device. A memory device includes memory space within a single physical storage device or memory space spread across multiple physical storage devices.

Software instructions may be read into the memory 1130 and/or the storage component 1140 from another computer-readable medium or from another device via the communication interface 1150. When executed, software instructions stored in the memory 1130 and/or storage component 1140 may cause the processor 1120 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

What is claimed is:

1. An apparatus for implementing a Real-Time (RT) Radio Access Network (RAN) Intelligent Controller (RT RIC) in an Open RAN (O-RAN) system, the apparatus comprising:
    memory storing instructions; and
    at least one processor configured to execute the instructions to:
        connect to an O-RAN distributed unit (O-DU) over an interface; and
        host one or more applications for controlling, via the interface, at least the O-DU over a real-time control loop with a latency of less than 10 ms,
    wherein the at least one processor is further configured to execute the instructions to connect to at least one of:
        a Service Management and Orchestration (SMO) framework for managing and orchestrating RAN elements, via a first interface that terminates at the RT RIC and at the SMO framework;
        a Non-RT RIC via a second interface that terminates at the RT RIC and at the Non-RT RIC; and
        a Near-RT RIC via a third interface that terminates at the RT RIC and at the Near-RT RIC, the Near RT-RIC and Non-RT RIC being distinct, and the first interface, the second interface, and the third interface each being distinct from an E2 interface.

2. The apparatus according to claim 1, wherein the at least one processor is further configured to execute the instructions to connect, over the first interface, to the Service Management and Orchestration (SMO) framework for managing and orchestrating RAN elements, in order to implement at least one management service.

3. The apparatus according to claim 1, wherein the at least one processor is further configured to execute the instructions to:
    obtain, from the Non-RT RIC via the second interface, at least one of policy-based guidance, machine learning (ML) management, and enrichment information for optimizing the O-RAN system.

4. The apparatus according to claim 1, wherein the at least one processor is further configured to execute the instructions to:
    obtain, from the Near-RT RIC via the third interface, at least one of policy-based guidance, machine learning (ML) management, and enrichment information for optimizing the O-RAN system.

5. The apparatus according to claim 1, wherein the at least one processor is further configured to execute the instructions to perform at least one of report, insert, control, and policy services with respect to the O-DU via the interface.

6. The apparatus according to claim 1, wherein the at least one processor is further configured to execute the instructions to perform at least one of interface management and service update functions with respect to the O-DU via the interface.

7. The apparatus according to claim 1, wherein the at least one processor is further configured to execute the instructions to host at least one application to integrate at least one Artificial Intelligence (AI)/Machine Learning (ML) model to Radio Resource Management (RRM) functions of the O-DU to make decisions and/or inferences in real-time.

8. The apparatus according to claim 1, wherein the at least one processor is further configured to execute the instructions to host at least one application for utilizing a MAC scheduler of the O-DU in real-time.

\* \* \* \* \*